United States Patent
Hofer et al.

(10) Patent No.: US 7,679,524 B2
(45) Date of Patent: Mar. 16, 2010

(54) REMOTE CONTROL FOR ISSUING COMMANDS TO A REMOTE-CONTROLLED DEVICE

(75) Inventors: Jürgen Hofer, Vienna (AT); Thomas Jatschka, Kleinengersdorf (AT); Alfred Pohl, Mistelbach (AT); Robert Tschofen, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 932 days.

(21) Appl. No.: 10/561,682

(22) PCT Filed: May 6, 2004

(86) PCT No.: PCT/EP2004/004847

§ 371 (c)(1),
(2), (4) Date: Jun. 27, 2006

(87) PCT Pub. No.: WO2005/002076

PCT Pub. Date: Jan. 6, 2005

(65) Prior Publication Data

US 2006/0229040 A1  Oct. 12, 2006

(30) Foreign Application Priority Data

Jun. 25, 2003 (DE) ................. 103 28 588

(51) Int. Cl.
*G08C 19/00* (2006.01)
*H02J 7/14* (2006.01)

(52) U.S. Cl. ............... 340/825.57; 340/825.7; 340/825.71; 340/825.72; 340/825.69; 320/106; 320/107; 320/108

(58) Field of Classification Search ............. None
See application file for complete search history.

(56) References Cited

U.S. PATENT DOCUMENTS

| | | | |
|---|---|---|---|
| 5,052,943 A | | 10/1991 | Davis |
| 5,140,326 A | | 8/1992 | Bacrania et al. |
| 5,625,180 A | | 4/1997 | Hanson et al. |
| 5,646,500 A | * | 7/1997 | Wilson ............ 320/108 |
| 5,736,795 A | * | 4/1998 | Zuehlke et al. ........ 307/130 |
| 6,084,381 A | | 7/2000 | Kajiura |
| 6,198,079 B1 | | 3/2001 | Essig |
| 6,208,115 B1 | * | 3/2001 | Binder ............ 320/108 |

(Continued)

FOREIGN PATENT DOCUMENTS

DE    36 18 464 A1    12/1987

(Continued)

OTHER PUBLICATIONS

Internet Address, http://203.147.194.107/infotooth/tutorial/lmp.asp, "LMP Lager Tutorial", Retrieved on Sep. 29, 2005, pp. 1-3, 3.1.2 Authentication, 3.1.3 Pairing, Retrieved on Sep. 29, 2005, pp. 1- 3.

*Primary Examiner*—Daniel Wu
*Assistant Examiner*—Fekadeselassie Girma

(57) ABSTRACT

The invention relates to a remote control for issuing commands to a remote-controlled device in a wireless manner. In said remote control, an assignment mode can run prior to start-up. The remote control also comprises a rechargeable battery for supplying power. The remote-controlled device is equipped with a docking point for the remote control, to which the latter can be temporarily fixed.

9 Claims, 3 Drawing Sheets

U.S. PATENT DOCUMENTS

| | | | |
|---|---|---|---|
| 6,863,247 B2 * | 3/2005 | Horst | 246/187 A |
| 6,870,475 B2 * | 3/2005 | Fitch et al. | 340/539.12 |
| 6,989,763 B2 * | 1/2006 | Wall et al. | 340/825.69 |
| 7,288,917 B2 * | 10/2007 | Art et al. | 320/107 |
| 7,525,283 B2 * | 4/2009 | Cheng et al. | 320/108 |
| 2002/0190956 A1 * | 12/2002 | Klein et al. | 345/169 |
| 2003/0030342 A1 * | 2/2003 | Chen et al. | 310/102 R |
| 2006/0043927 A1 * | 3/2006 | Beart et al. | 320/108 |

FOREIGN PATENT DOCUMENTS

| | | |
|---|---|---|
| DE | 38 13 590 A1 | 11/1988 |
| DE | 41 30 903 A1 | 3/1993 |
| DE | 44 42 224 A1 | 5/1996 |
| DE | 195 23 901 A1 | 1/1997 |
| DE | 198 49 075 A1 | 4/2000 |
| EP | 1 291 832 A1 | 3/2003 |
| GB | 2 204 426 A | 11/1988 |

* cited by examiner

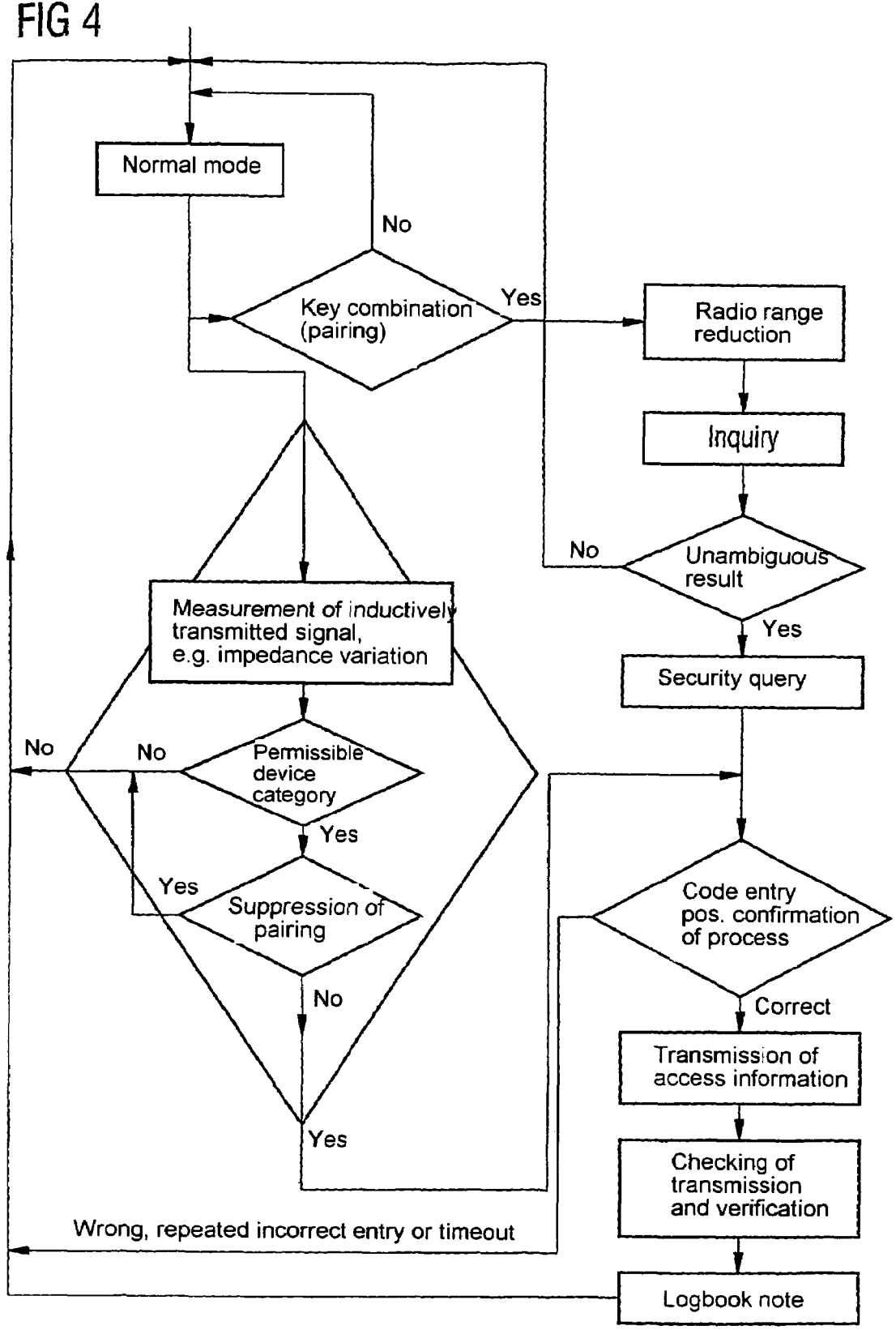

REMOTE CONTROL FOR ISSUING COMMANDS TO A REMOTE-CONTROLLED DEVICE

CROSS REFERENCE TO RELATED APPLICATIONS

This application claims priority to the German application No. 10328588.1, filed Jun. 25, 2003 and to the International Application No. PCT/EP2004/004847, filed May 6, 2004 which are incorporated by reference herein in their entirety.

FIELD OF INVENTION

The invention relates to a remote control for issuing commands wirelessly to a remotely controllable device, said remote control being able to execute an assignment mode prior to startup and having a rechargeable battery for supplying power.

BACKGROUND OF INVENTION

Particular requirements are placed on remote controls or telecontrols for items of industrial or agricultural equipment. On the one hand, rough service conditions preclude the use of filigree, easily contaminated plug-in contacts for charging or information transmission purposes; on the other hand, for safety reasons it must be possible for a remote control to be reliably and unambiguously assigned to a device. The accidental control and startup of an "external" unit could not only cause material damage by also endanger human life and health.

SUMMARY OF INVENTION

With known remote controls, assignment or reassignment is performed in an assignment mode which, e.g. after entry of a PIN code on the remote control, is execute d via the radio interface which is also used for telecontrol, thereby already running the risk of inadvertently "addressing" other devices within radio range. This applies analogously to remote controls which employ infrared or ultrasound for wireless data transmission.

One object of the invention is to overcome the described disadvantages for remote controls of the type considered here.

This object is achieved with a remote control of the above specified type wherein there is inventively provided on the remotely controllable device a docking point for the remote control to which the remote control can be temporarily fixed. At the docking point, charging power for the rechargeable battery can be fed from the device to the remote control via a n inductive power interface, and information transmission can be performed at the docking point at least for initialization of assignment mode.

Thanks to the invention, not only can the rechargeable battery be charged up at the docking point without contact-making problems, but assignment mode is also executed or at least initiated here.

It is particularly advantageous if the power interface has a transformer half fixed-mounted in the device and having at least one coil as well as a transformer half fixed-mounted in the remote control and having at least one coil, and the transformer halves form a transformer when the remote control is docked, the term "transformer half" in the context of the invention signifying not only precisely half of the transformer, but "halves" here meaning two complementary parts of a transformer.

A practical variant of the remote control is characterized in that there is provided a magnetic mount for fixing it to the device. For fixing of this kind, smooth, easily cleaned surfaces can be present at the docking point.

It is further expedient for each transformer half to possess a core and at least the core of one transformer half to contain a permanent magnet. In this case the transformer core additionally assumes the function of a magnetomechanical holding circuit.

In an advantageous embodiment of the invention, the transformer is employed for information transmission in respect of initialization mode, thereby providing an additional use for the transformer.

According to an easily implementable variant, the one or more coils of the transformer half fixed-mounted in the remote control are loadable with a variable impedance which is switchable with a defined characteristic frequency, a filter assigned to the characteristic frequency being provided in the circuit of the one or more coils of the transformer half fixed-mounted in the device.

BRIEF DESCRIPTION OF THE DRAWINGS

The invention together with further advantages will now be explained in greater detail with reference to exemplary embodiments which are illustrated in the accompanying drawings in which FIG. 4 shows a possible initialization sequence in a flow-chart.

DETAILED DESCRIPTION OF INVENTION

Figure 1:
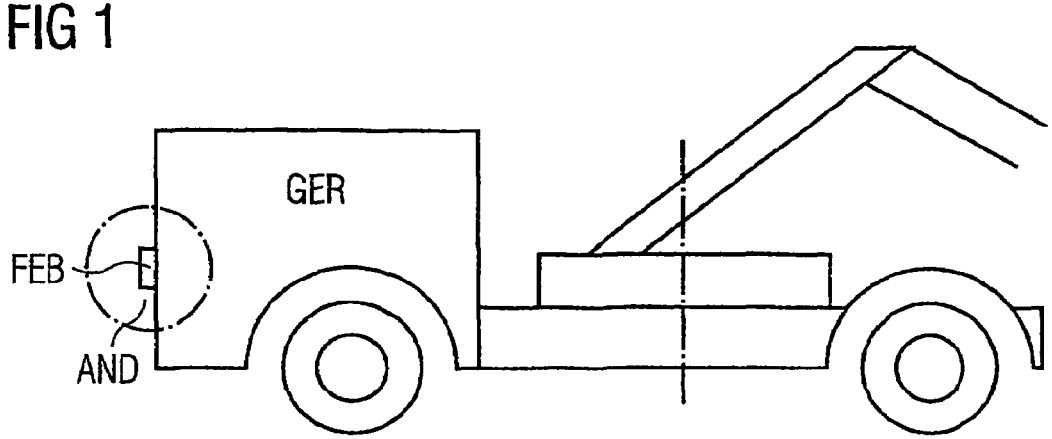
FIG. 1 shows a schematic side view of a device, e.g. a mobile loading crane, with remote control docked thereon, FIG. 2 schematically illustrates the docking point in FIG. 1 enlarged and in partial section.

FIG. 1 shows a device GER, e.g. a mobile loading crane, or some such item of industrial or agricultural equipment, which can be wirelessly operated using a remote control. A remote control FEB of this kind which can be hand-held by an operator is temporarily fixed, as shown in FIG. 1, to a docking point AND of the device GER, either only mechanically using a suitable retainer, or by means of a magnetic mount which will be explained below.

Figure 2:
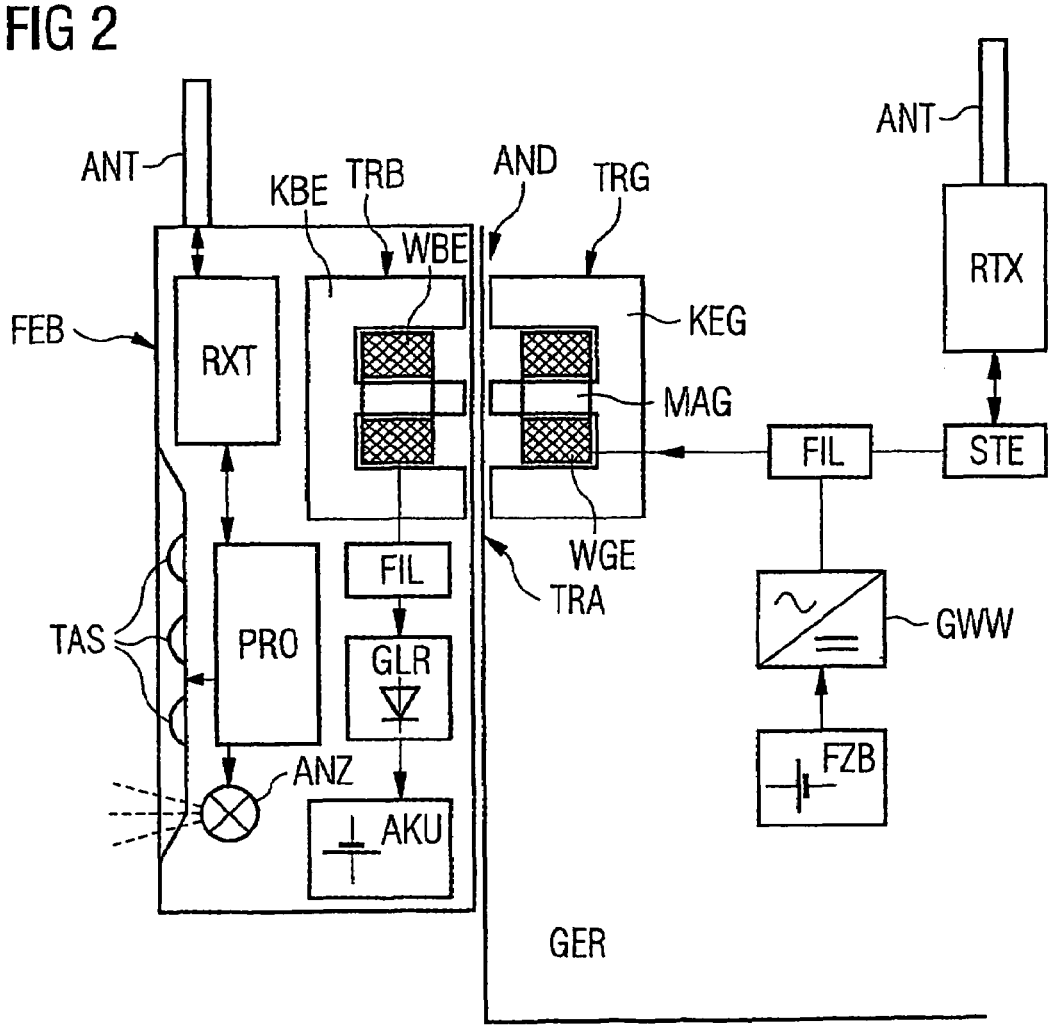

More precise details are shown in greatly enlarged form compared to FIG. 1 in the schematic sectional view in FIG. 2. The device GER contains a transformer half TRG which possesses a core KEG, here a pot core, and a coil WGE or winding. The core KEG contains a permanent magnet MAG which in this case forms the central section of the core KEG. In variants, the magnet can be disposed at other locations, it being always essential that it fulfils its retaining function for the remote control FEB.

In the remote control FEB there is disposed, mirror-image-like, a second transformer half TRB which likewise possesses a core KBE and a winding or coil WBE. The "open" sides of the two transformer halves TRB, TRG are disposed directly on an outer wall of the housing of the remote control or of the device GER and covered only by the respective device wall which is made of plastic or a non-magnetizable metal.

It will be immediately clear from FIG. 2 that the remote control FEB can be temporarily fixed in the manner described to the device GER, as the two cores or core halves KBE, KEG attract one another because of the permanent magnet MAG contained in their magnetic core.

It should be noted at this point that the core KBE in the remote control FEB can also contain a permanent magnet whose polarity can be selected such that, for particular remote controls, repulsion rather than attraction occurs in interaction with particular devices at the docking point which can be marked accordingly, which means that pairings of remote controls and devices can be indicated as not permitted from the outset.

The docking point AND is used as an inductive power interface at which charging power can be fed from the device GER to a rechargeable battery AKU of the remote control FEB, as explained below.

The device GER contains a power source, e.g. a 24 or 48 volt vehicle battery. This battery voltage is converted via a DC/AC converter GWW into an AC voltage and fed as such to the coil. If the voltage is converted to a 50 Hz AC voltage, the remote control FEB is compatible with simple AC-line-fed chargers. Not shown, but nevertheless clear to the average person skilled in the art, is that the converter GWW is only activated when the remote control is docked, e.g. using a contactless switch such as a reed contact.

The AC voltage induced in the secondary coil WBE of the transformer TRA is rectified e.g. by means of a rectifier GLR and fed to the rechargeable battery AKU to charge it. Suitable charging and regulating circuits known to the average person skilled in the art can self-evidently be used depending on the type of rechargeable battery. The charging status and charging process can also be indicated.

The remote control FEB has a transceiver RTX operating in conjunction with an antenna ANT. There is further provided a controller PRO, e.g. a microprocessor, which can also be part of the transceiver RTX. Keys TAS of a keypad allow commands to be entered to the controller PRO and, via the transceiver RTX and the antenna ANT, to the device GER which has a corresponding distant station (not shown) for radio communication.

Like the remote control FEB, the device GER also has a transceiver RTX with an antenna ANT, important radio functions of the transceiver, such as here in particular the output power and receiver sensitivity, being influenceable both in the remote control FEB via the controller PRO and in the device GER via the controller STE.

A known radio standard such as Bluetooth is advisably used for wireless communication between remote control FEB and device GER.

Alternatively it is possible for ultrasound or infrared to be used for information transmission.

The invention additionally provides that at the docking point which, as explained above, is initially used for power transmission for charging the rechargeable battery, information transmission relating to assignment mode can also be carried out. This information transmission at the docking point can take place in a variety of ways and some possibilities will be explained below.

FIG. 2 shows the possibility of information transmission via the transformer TRA, whereby signals can be coupled out both in the remote control FEB and in the device GER via a filter FIL and can be transmitted from the controller PRO in the remote control FEB and a controller STE in the device GER across the transformer interface TRA and vice versa.

Figure 3:
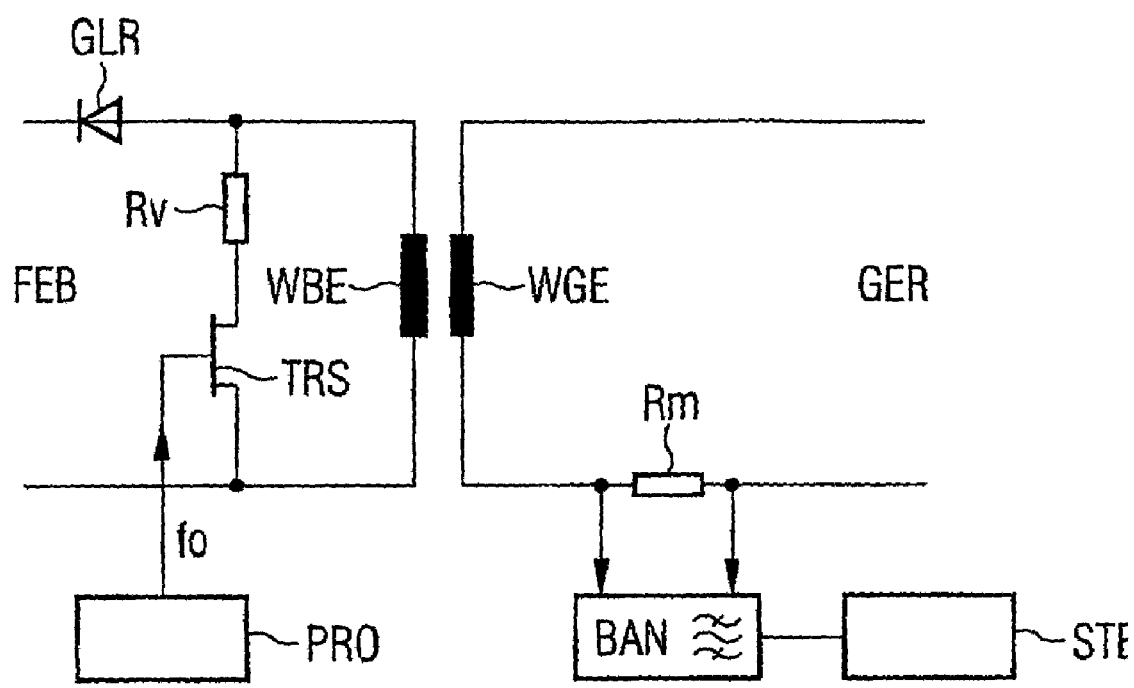
FIG. 3 shows the block diagram for information transmission in initialization mode for a possible embodiment.

A simple possibility for information transmission in the sense of "recognizing" a remote control is outlined in FIG. 3. The coil WBE of the transformer half in the remote control is shunted by a transistor TRS, possibly in series with a dropping resistor Rv. The transistor TRS can be turned on by the controller PRO of the remote control FEB using a predefined individual frequency $f_0$, e.g. 1 kHz, so that the impedance accordingly varies strongly. On the device side, these periodic variations produce a voltage drop across a precision resistor Rm, and a filter BAN tuned to the individual frequency delivers the resulting signal to the controller STE of the device.

If a remote control FEB is docked onto the device GER, the rechargeable battery AKU can be charged immediately. Furthermore, it is only by means of a current and impedance measurement on the part of the device that it can be detected that a remote control is present.

With a measurement e.g. as shown in FIG. 3, identification is also possible. It is further possible for data such as a key, PIN, etc. to be exchanged via the transformer interface TRA. However, a radio mode can be also initialized even at this stage which causes the radio codes of remote control FEB and device GER to be assigned e.g. for Bluetooth. In this way the parameters of the remote control can be simultaneously adapted to the type of device to be operated or operating parameters can be transmitted to the remote control. In order to ensure that the data has been completely transmitted in assignment mode, the end and/or the progress of data transmission can be indicated, e.g. using a display light source ANZ.

Preferably the device GER is actually controlled via radio by means of the remote control generally held in the operator's hand, a few input keys TAS on a keypad mainly sufficing for this purpose. With the remote control docked, several or just one of these keys can be used to start the assignment mode sequence, so that there is no need for complicated entries via alphanumeric keypads. The data interchange necessary for assignment then takes place automatically.

As assignment takes place at the docking point, it is also possible to transmit the necessary data via radio, the radio range being reducible to the point that radio communication with other units can be eliminated. An example of an identification and assignment procedure is described e.g. for the Bluetooth standard in: "LMP Lager Tutorial", 3. 1. 2 Authentication, 3. 1. 3 Pairing (freely accessible on the www at http://203.147.194.107/infotooth/tutorial/lmp.asp).

A possible initialization sequence is explained in FIG. 4 which describes a sequence of this kind, beginning with docking. In this sequence, use is made of the abovementioned but in no way compulsory radio transmission with range reduction.

It is also worth mentioning that the docking point with its (additional) inductive interface enables e.g. a notebook or other service device to be connected by a service engineer. A cable connected to the service device can have e.g. a "lock-on head" which—like the remote control—contains the complementary half of the transformer TRA.

The invention claimed is:

1. A remote control for wirelessly issuing commands to a remotely controllable device, comprising: a control unit for executing an assignment mode prior to startup of the remote control; and a rechargeable battery for providing a power supply to the remote control, wherein the remote control is configured to be temporarily and removably fixed to a docking point arranged at the remotely controllable device; the rechargeable battery is configured to be charged by the remotely controllable device via an inductive power interface when the remote control is fixed to the docking point; and the docking point is configured to transmit information to the remote control, the information configured at least for triggering execution of the assignment mode on the remote control;

wherein the power interface comprises: a first transformer part fixed-mounted to the remotely controllable device having at least one first coil; and a second transformer part fixed-mounted to the remote control having at least one second coil, wherein the first and second transformer parts form a transformer when the remote control is docked at the docking point;

wherein the second coil is configured to carry an electrical load of a controllable impedance, the controllable impedance configured to be switched by a specific frequency.

2. The remote control according to claim 1, wherein the remote control is configured to be fixed to the remotely controllable device using a magnetic mounting holder arranged at the remotely controllable device.

3. The remote control according to claim 1, wherein the first and second transformer parts each comprise a core with at least one of the cores including a permanent magnet.

4. The remote control according to claim 1, wherein the transformer is configured to transmit information related to the assignment mode.

5. The remote control according to claim 1, wherein the transformer is configured to transmit information related to an initialization mode.

6. The remote control according to claim 5, wherein the initialization mode is configured to trigger the execution of the assignment mode.

7. The remote control according to claim 1, wherein the first coil is arranged in a first electric circuit, the first electric circuit comprising a filter tuned to the specific frequency.

8. A wireless remote control system, comprising: a remote control having a control unit, the control unit configured to execute an assignment mode prior to startup of the remote control; the remotely controllable device; a rechargeable battery for providing a power supply to the remote control; a docking point arranged at the remotely controllable device for temporarily and removably supporting the remote control; and an inductive power interface for charging the rechargeable battery when the remote control is docked at the docking point, wherein the docking point is configured to transmit information to the remote control, the information configured at least for triggering execution of the assignment mode on the remote control;

wherein the power interface comprises: a first transformer part fixed-mounted to the remotely controllable device having at least one first coil; and a second transformer part fixed-mounted to the remote control having at least one second coil, wherein the first and second transformer parts form a transformer when the remote control is docked at the docking point;

wherein the second coil is configured to carry an electrical load of a controllable impedance, the controllable impedance configured to be switched by a specific frequency.

9. The remote control system according to claim 8, wherein the first coil is arranged in a first electric circuit, the first electric circuit comprising a filter tuned to the specific frequency.

* * * * *